United States Patent
Chan

[11] Patent Number: 6,056,342
[45] Date of Patent: May 2, 2000

[54] MULTI-PURPOSE TONGS

[76] Inventor: Ping-Shun Chan, 20A Elegant Villa, 4 Tsing Yung Street, N.T., Tuen Mun, The Hong Kong Special Administrative Region of the People's Republic of China

[21] Appl. No.: 09/197,914

[22] Filed: Nov. 23, 1998

[30] Foreign Application Priority Data

Apr. 8, 1998 [CN] China .................................. 98102931

[51] Int. Cl.$^7$ .............................. A47G 21/10; A47J 43/28
[52] U.S. Cl. ............................................ 294/99.2; 294/33
[58] Field of Search ................................. 294/8.5, 11, 16, 294/25, 33, 99.2; 30/142, 150; 606/210; D7/683–686

[56] References Cited

U.S. PATENT DOCUMENTS

| | | | |
|---|---|---|---|
| 450,266 | 4/1891 | Truax | 294/99.2 X |
| 1,545,693 | 7/1925 | Phoel | 294/99.2 |
| 2,634,728 | 4/1953 | Dale | 294/99.2 X |
| 4,002,365 | 1/1977 | Rader . | |
| 4,275,646 | 6/1981 | Barna | 294/99.2 X |
| 5,076,628 | 12/1991 | Rader . | |
| 5,551,741 | 9/1996 | LaBoccetta . | |
| 5,649,728 | 7/1997 | Warthen . | |

FOREIGN PATENT DOCUMENTS

| | | |
|---|---|---|
| U-86204660 | 7/1987 | China . |
| U-87211481 | 6/1988 | China . |
| Y-2156775 | 2/1994 | China . |
| 466117 | 5/1914 | France .................................. 294/99.2 |
| 742955 | 3/1933 | France .................................. 294/99.2 |
| 1159826 | 2/1958 | France .................................. 294/99.2 |
| 1179693 | 5/1959 | France .................................. 294/99.2 |
| 1363979 | 5/1964 | France .................................. 294/99.2 |
| 610923 | 10/1948 | United Kingdom .................. 294/99.2 |
| 1468498 | 3/1977 | United Kingdom . |

*Primary Examiner*—Johnny D. Cherry
*Attorney, Agent, or Firm*—Alix, Yale & Ristas, LLP

[57] ABSTRACT

A type of multi-purpose tongs for gripping food and small articles which is made of a resilient metal strap, comprises a U-shape handle and two opposing pairs of arms and holding members. The arms have an elongated shape and are crossed to assume a ready-to-work state. The holding members are configured to grip articles and to prevent the arms from slipping out of the crossed state. When in use, the tongs are pinched inwards with fingers to increase the deformation of the U-shaped handle and then to open the holding members to grip articles. After gripping, it is not necessary to exert forces since an article can be held continuously by the resilience provided by the deformation of the handle.

18 Claims, 5 Drawing Sheets

MULTI-PURPOSE TONGS

FIELD OF THE INVENTION

The present invention relates to a type of tongs. More particularly, the present invention relates to a type of metal-made multi-purpose tongs for gripping food and small articles.

BACKGROUND OF THE INVENTION

Existing cutlery is generally ineffective for taking food easily from serving dishes. This is especially true when food is being shared among several users. In addition, personal hygiene considerations are becoming so increasingly important that a universal grasping utensil for universal use and application is highly desirable. The present invention relates to an improved implement which is inexpensive and provides a highly versatile and convenient utensil for handling, grasping, serving, slicing and scooping various foods.

Conventional tongs to which the invention relates are open-shaped, and the user is required to constantly exert an inward force with the fingers when holding an article. When moving the article by hand, for example, putting bread onto a plate or bringing a piece of cake to a table, the food or the like, which is being held, can be prevented from slipping from the tongs only by exerting forces inwardly with the fingers. This is very inconvenient, and the hand will be tired very soon by continuous usage. Moreover, this type of tongs can only be utilized to grip food and cannot be utilized to grip medicine bottles, ink bottles or the like due to the improper configuration of the holding members of the tongs. Also, the width of the article should be a little smaller than the width of the opening of the tongs' holding members, and this opening width cannot be adjusted. In addition, known tongs are not readily adaptable for separating pieces of food. Therefore, a type of multi-purpose tongs, capable of overcoming the above disadvantages and being more convenient to use is desirable. Such a type of tongs can be used instead of commonly-used chopsticks and spoons to improve hygienic conditions for public gatherings.

Conventional types of tongs have a unitary construction and are configured to spring open automatically upon release of the manual grasping of the tongs by the user. However, most types of tongs do not provide the multiplicity of functions for cutting, slicing and scooping.

SUMMARY OF THE INVENTION

The object of the present invention is to provide multi-purpose tongs for gripping food and small articles. The tongs are of a type made of a piece of a metal strap and have an efficient construction for gripping articles conveniently. The resilience provided by the metal strap is utilized as the primary force to hold food and small articles. The holding members at the front end of the tongs can be used to separate or cut food.

The object of the invention is achieved by providing a tongs, which are made of a strip of a metal sheet which can provide proper resilience. The tongs comprise a U-shaped handle having a proper width. Two wings of said handle extend forward from the apex of the U shape to bending points to define a wing angle $\alpha$ with respect to the other wing. The wings oppositely bend inwards at an angle $\beta$. Each wing is provided with a stopper guide whose width is about half of that of the handle. The stopper guides are respectively positioned on the opposite sides offset from each other and have round or flat tops. Two gripper arms extend outwards from the stopper guides on the first side and the second side of said handle, respectively. The arms are made of metal strap and act as connecting bars with their width being about half of that of the handle, while the first arm is positioned oppositely to the second stopper guide and the second arm is positioned oppositely to the first stopper guide. Two holding members integrally extend at the front ends of the two gripper arms, respectively. The holding members comprise the holding surfaces for gripping food and articles. The holding members are provided with bowl-shaped rounded surfaces. The two arms are crossed after being twisted slightly inwards whereby the U-shaped handle is deformed to create resilience, and due to the mutual engagement of the two holding members, the two gripper arms present a stable crossed configuration which constitutes the ready-to-work state of the multi-purpose tongs.

An object of the invention is to provide a new and improved set of tongs which has an efficient and low cost construction and is versatile for usage.

Another object of the invention is to provide a new and improved set of tongs which has a multiplicity of functions, including handling, grasping, serving, slicing and scooping the food products, as well as holding small articles.

A further object of the invention is to provide a new and improved set of tongs which is easily cleanable.

Other objects and advantages of the invention will become apparent from the specification and the drawings.

BRIEF DESCRIPTION OF THE DRAWINGS

The present invention will be better understood from the following description taken in conjunction with the accompanying drawings, in which.

DETAILED DESCRIPTION OF THE PREFERRED EMBODIMENT

Figure 1:
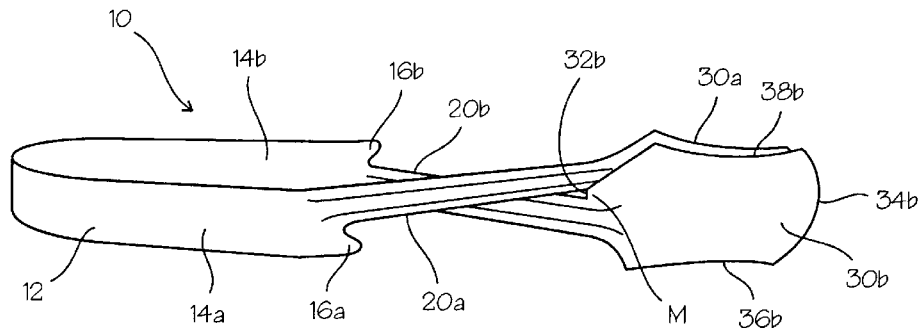
FIG. 1 is a perspective view of an embodiment of the present invention.

Referring to the perspective view of an embodiment of the present invention as shown in FIG. 1, one embodiment of the multi-purpose tongs 10 of the present invention is shown in a ready-to-work state. The multi-purpose tongs comprise integrally connected primary component sets, i.e., a U-shaped handle 12, two crossed gripper arms 20a, 20b in the form of narrow bars and two holding members 30a, 30b positioned at the outermost or working distal end of the multi-purpose tongs. In the ready-to-work state of FIG. 1 without any article being held, the two arms 20a, 20b are crossed and are prevented from sliding apart and springing back since two anti-slide abutments 32a, 32b positioned on the holding members obstruct each other from moving further and maintain the multi-purpose tongs in this ready-to-work state.

When in use, once the left and right wings 14a, 14b of the handle are pinched inwardly by fingers of the user, the gripping ends of the holding members 30a, 30b will be opened. After the article has been gripped, the user can stop exerting forces inwardly with fingers, and the article is then held by the tongs. Thus, the user will feel more relaxed. Since the multi-purpose tongs 10 are made of a strip of metal strap which has proper resilience and the handle is U-shape configured to create resilience, this type of multi-purpose tongs can be applied to grip small articles. The form of handle 12 is not limited to a parallel side configuration. The handle can be shaped to introduce the required resilience of different strap thicknesses and sizes of tongs.

Figure 2:
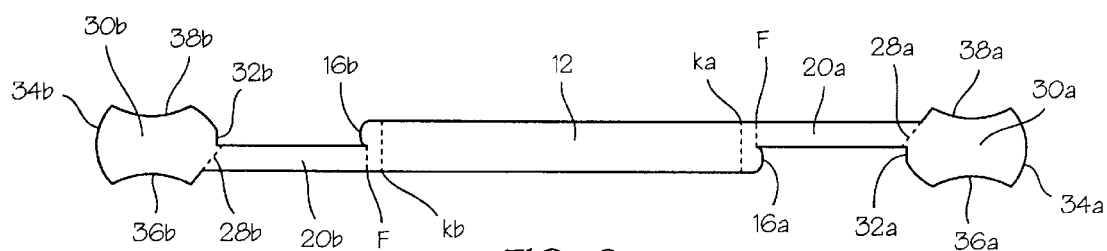
FIG. 2 is a plan view of a pre-formed non-folded state of the multi-purpose tongs of the invention.

With additional reference to FIG. 2, arms 20a, 20b are formed into narrow bar shape with their width being half or greater than that of handle 12. Two stopper guides 16a, 16b can be provided at the portions adjacent to the junctions of arms 20a, 20b and handle 12. The stopper guides can be flat, semi-circular or angled, etc. Stopper guides 16a, 16b shown in the figures are approximately semi-circular. The main function of the stopper guides is to limit the pivoting range of arms 20a, 20b to provide a stop when one shoulder of a guide encounters the opposite arm. Therefore, the maximum size of the article capable of being gripped by the multi-purpose tongs is defined. The stopper guides 16a, 16b, being constructed of sheet metal, may be bent or deformed toward the apex and away from the holding members to increase the maximum possible span between the holding members and thus the maximum size of the article capable of being gripped. Another function of the stopper guides 16a, 16b is to provide a catch to hang the tongs on the edge of a dish or other utensil in order to prevent the tongs from sliding into the dish or other utensil.

Referring to FIG. 2, the multi-purpose tongs 10 of an embodiment shown in FIG. 1 have been unfolded and flattened to illustrate a plan view of the blanking during fabrication. Naturally, the view is illustrative, and it can be proportioned to the required scale to implement a given fabrication. The multi-purpose tongs are manufactured from a metal strap, for example, resilient steel sheets or resilient stainless steel sheets having a thickness of between 0.2 mm to 1 mm. The handle 12 is made of wider metal strap extending to the broken lines designated by F on both sides. The asymmetrical arms 20a, 20b extend outwardly from the broken lines designated by F. Holding members 30a, 30b integrally extend from the ends of the arms. Either of the two holding members 30a, 30b has three arcuate outer edges wherein arcuate rims 34a and 34b positioned at the ends of the gripping ends are convex outwards and arcuate rims 36a, 36b and 38a, 38b positioned at both sides of the gripping ends are concave inwards. The three arcuate rims can be utilized to separate or cut food.

Holding members 30a, 30b and arms 20a, 20b are joined along broken lines 28a and 28b (which do not exist in the real objects). These broken lines indicate that they are greater than the width of arms 20a, 20b due to the fact that a hypotenuse is longer than a right-angle side. By contrast, for a conventional spoon, the width of the connection portion between the bowl and the handle of a spoon is equal to the width of the handle, and it is easiest to be broken off at the joint between the bowl and the handle of a spoon. It should be noted that the strength of the embodiment of the present invention shown in this figure has been enhanced since joints 28a and 28b are greater than the width of arms 20a, 20b. FIG. 2 does not show that the holding members 30a, 30b are formed into a bowl shape, as is more apparent from other drawings.

At the two outermost ends of the handle, there are two ogival stopper guides 16a, 16b which form a shoulder so that guide 16a prevents arm 20b from overstepping and guide 16b prevents arm 20a from overstepping. The broken lines Ka and Kb on the handle shown in FIG. 2 represent the bending line as seen in additional detail in FIG. 3.

Figure 3:
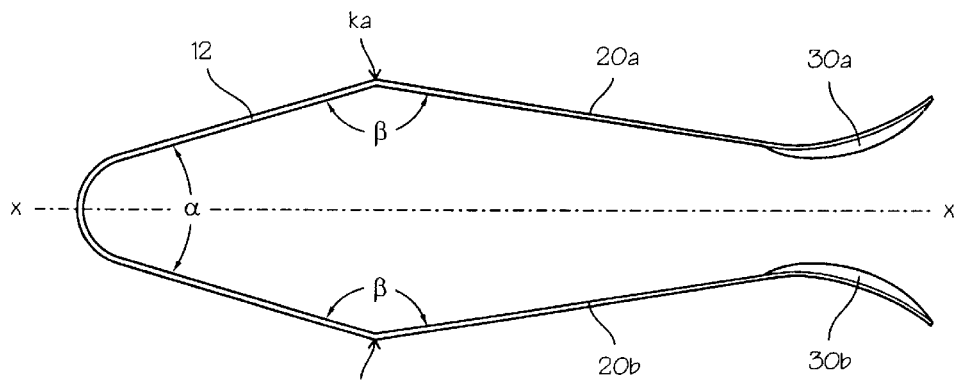
FIG. 3 is a generally top side view, partly in schematic to illustrate various geometric relationships, of the multi-purpose tongs of the present invention in which the tongs are in a second pre-formed natural state.

A side view of the multi-purpose tongs of the invention with the arms 20a, 20b uncrossed is illustrated in FIG. 3. The FIG. 3 configuration of the multi-purpose tongs can be formed according to the following steps: a flat blank (FIG. 2) of the multi-purpose tongs is pressed downwards from the middle of the handle 12 by an arc-shaped die while making the bowls of holding members 30a, 30b facing outwardly. The workpiece then is pressed outwards at opposite positions Ka, Kb. The shape of the multi-purpose tongs is substantially symmetrical with respect to a central axis x. An angle α, which can be used to represent quantitatively the U-shape of handle 12, the positions of Ka, Kb and the angle β can be selected to determine the substantial desired shape of the multi-purpose tongs. Angles α and β need not be defined by sharp vertices but may be rounded. Various tongs with different resilience and different size ranges of articles to be gripped by the tongs can be designed and fabricated by varying the degrees of angles α, β and the positions of Ka, Kb. The holding members 30a, 30b in this state are formed into opposite spherical shapes or bowl shapes.

The state shown in FIG. 3 is a state in which the required resilience has not been fully loaded. The ready-for-use state of the multi-purpose tongs 10 shown in FIG. 1 can be achieved by bending two arms 20a, 20b inwardly with a slight twist until they move in crossways. It can be seen, by comparing FIG. 1 with FIG. 3 (which is an obverse view), that the handle 12 portion can provide resilience due to being pinched inwardly. The greater the crossed part of the two arms, the smaller the angle α, and the greater the resilience.

The spherical shape of holding members 30a, 30b facilitates the holding of food and small articles, especially the holding of steamed stuffed buns, steamed bread and eggs or the like. In addition, the spherical bowl shape of the holding members of the multi-purpose tongs can be effectively utilized as spoons.

Figure 4:
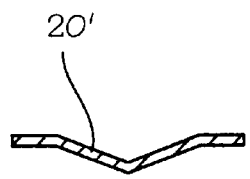
FIG. 4 is an enlarged cross-sectional view of the multi-purpose tongs of the present invention with either of its two grippers arms being bent along its length to form a triangular profile.

FIG. 4 is a cross-sectional view of an embodiment of the multi-purpose tongs with the gripper arms 20a, 20b being further bent along a longitudinal axis. Since flat sheets or straps are easily deformed, they do not have enough rigidity. In order to enhance the rigidity of arms 20', the thin metal strap of the arm portions are each bulgedly deformed along its length and thereby a triangular or other similar cross-sectional shapes are formed as shown in FIG. 4. This construction significantly enhances the rigidity of arms 20a, 20b. Also, the bulge can extend slightly toward both sides, that is, in one side extending to the vicinities of bending points Ka, Kb of handle 12 and in another side further extending to a point slightly beyond the broken lines 28a, 28b. The described bend configuration can significantly enhance the strength and rigidity of the multi-purpose tongs. The shape of the bulge can be of half-round, oval or any combination shape that can improve the rigidity of the gripper arms 20a, 20b.

Figure 5:
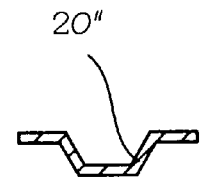
FIG. 5 is an enlarged cross-sectional view of the multi-purpose tongs of the present invention with either of its two gripper arms being alternatively bent along its length to form a trapezoidal profile.

The arms 20" of the multi-purpose tongs shown in FIG. 5 are bulgedly deformed to provide a trapezoidal shape for the same reason described with respect to FIG. 4. The trapezoid-shaped bulge can be molded by dies at one time, and this is an alternative embodiment of the enhancement of the rigidity of arms 20a, 20b.

Figure 6:
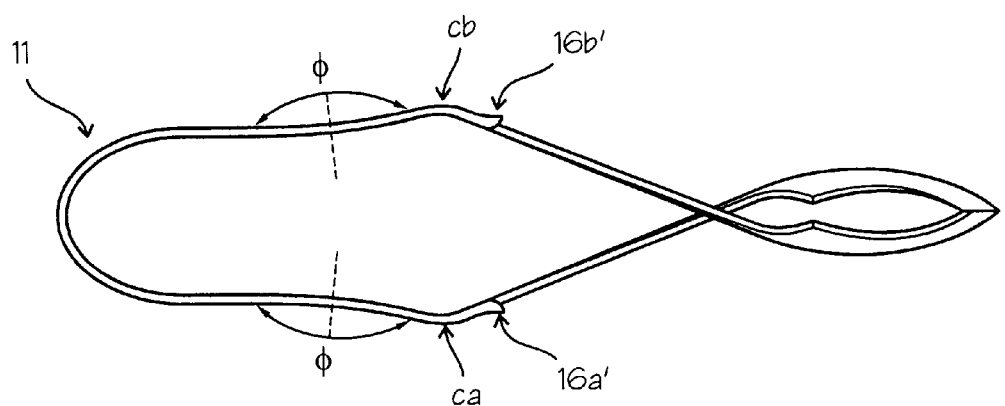
FIG. 6 is a generally top side operational view, partly in schematic to illustrate various geometric relationships, of the multi-purpose tongs of the present invention in which a holding part is provided with two smooth profiles and two stopper guides are slightly bent outwardly.

An alternative embodiment 11 of the invention is shown in FIG. 6. The main technical features of tongs 11 are the same as that of the foregoing embodiments. The constructional features of this tongs 11 are that at the vicinities of inwardly bending points Ka, Kb of the handle of the multi-purpose tongs, or, from the extensions of two wings of the U-shaped bend to the vicinities of Ka, Kb, there are outward smooth bends with a bending angle φ, and then small smooth bulges ca, cb. Due to the arrangement of angle φ, the resilience of the multi-purpose tongs, and the shape of the multi-purpose tongs, can be adjusted by varying angle φ, as well as angle α and angle β. In addition, stopper guides 16a', 16b' are also slightly bent outwards. All of the three constructional features mentioned above make the user feel more comfortable when holding the tongs by hand. The outwardly bent portions of stopper guides 16a, 16b are contoured to receive the user's fingers and thereby facilitate the use of the multi-purpose tongs, including the exertion of forces to the tongs.

Figure 7:
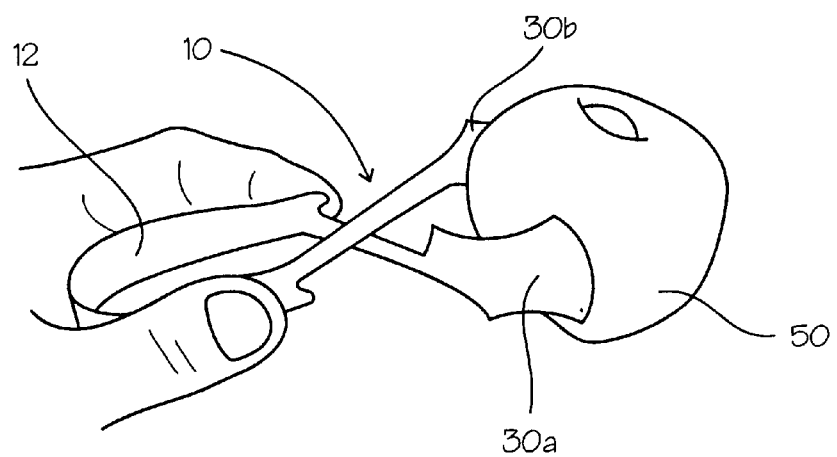
FIG. 7 is a perspective view of the multi-purpose tongs of the present invention, illustrating the fingers of a user when holding a piece of food or a small article.

A schematic view of a user of the multi-purpose tongs 10 of the invention holding a small article 50 is illustrated in FIG. 7. The figure shows the application of the multi-purpose tongs. By exerting forces with fingers in the regions of points Ka, Kb of the handle 12, the holding members 30 will be opened. After an article 50 or a piece of food has been gripped, there is no need to continue to exert forces since the tongs can hold the article continuously under the resilience of the metal material. The article 50 can readily be moved to any place desired.

Figure 8:
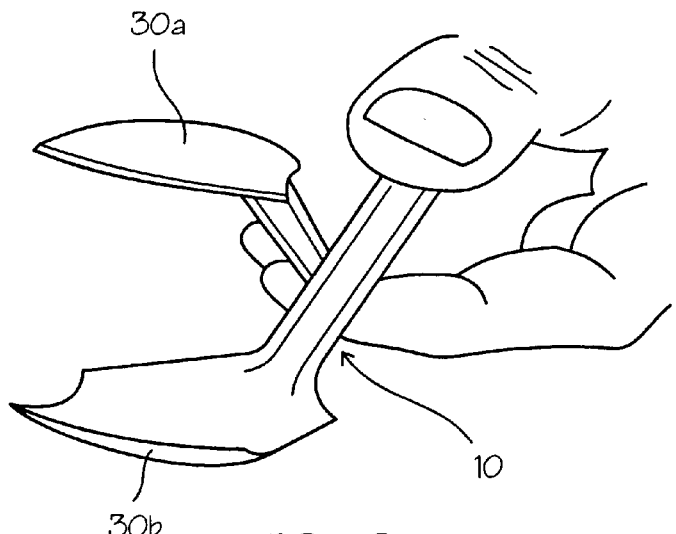
FIG. 8 is a perspective view of the multi-purpose tongs of the present invention, illustrating the fingers of a user with the holding members being forced opened.

The tongs 10 of the invention are utilized as spoons in FIG. 8 to further illustrate the versatility and multi-purpose capability of the tongs. One of the holding members 30b, shaped like a spoon, is carrying some soup.

Figure 9:
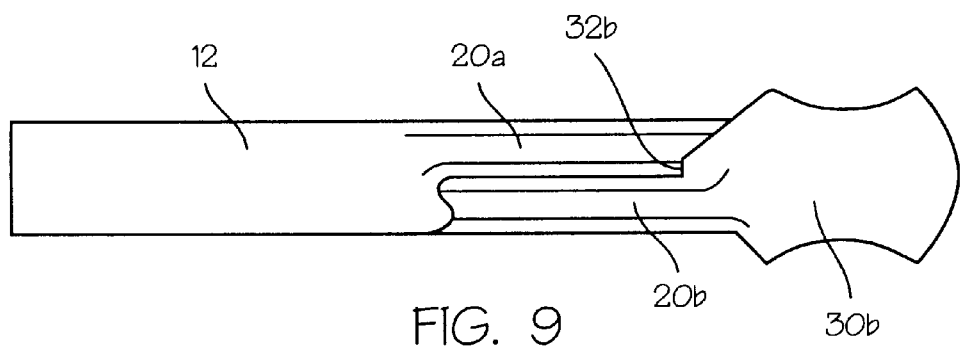
FIG. 9 is a side view, partly in schematic to illustrate various geometric relationships, of the multi-purpose tongs of the present invention, showing ridges provided on the arms and anti-slide edges provided on the holding members.

Referring to the side view of the multi-purpose tongs of the invention shown in FIG. 9, two main constructional features are illustrated. One feature is that the arms 20a, 20b are formed with bulges to enhance their rigidity as described above (FIGS. 4, 5). Four lines on the arms in the figure illustrate the bulges. Another feature is a small anti-slide abutment 32a, 32b (only 32b illustrated), positioned at the junction of the inner upper edge of each holding member end and each arm. The abutment is a flat step instead of circular, so that when two holding members 30a, 30b cross each other, they cannot slide and slip apart easily.

Figure 10:
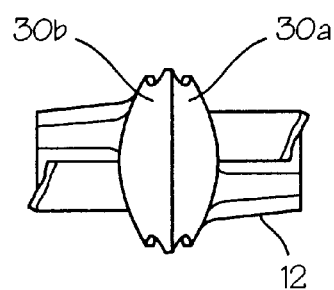
FIG. 10 is a distal end view of the holding members of the multi-purpose tongs of the present invention viewed from the right of FIG. 1.

A view seen from holding members 30a, 30b towards the U-shaped handle 12 is illustrated in FIG. 10. The spherical shape of holding members 30a, 30b is more dramatically shown. Besides holding food and small articles, these two holding members 30a, 30b can also be utilized as spoons or for separating food. The holding rim edges 34a, 34b, 36a, 36b, 38a, 38b are defined by three arcuate edge blades to cut food, and so on.

Figure 11:
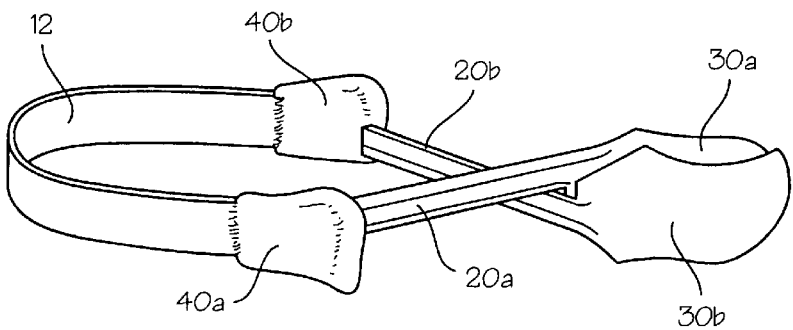
FIG. 11 is a perspective view of a second embodiment of the multi-purpose tongs of the present invention, showing finger rests positioned at bends of the handle.

With reference to FIG. 11, finger rests 40a, 40b are additionally mounted at the portions adjacent to the inner bending lines of handle 12 of the multi-purpose tongs to facilitate usage.

Figure 12:
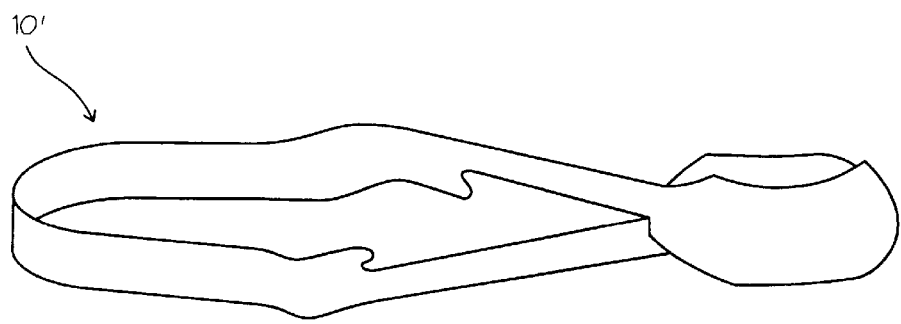
FIG. 12 is a perspective view of a third embodiment of the multi-purpose tongs of the present invention, showing an opposite handed embodiment to that of FIG. 1.

With reference to a constructional embodiment of the multi-purpose tongs 10' of the invention shown in FIG. 12, the construction of the multi-purpose tongs 10 of FIG. 1, has the same basic constructional features, but the relative positions of the gripper arms 20a, 20b are reversed. Comparing to FIG. 1, the positions of arms 20a, 20b have been exchanged so that users can choose either of the two types to match their own left or right-handed orientation.

Figure 13:
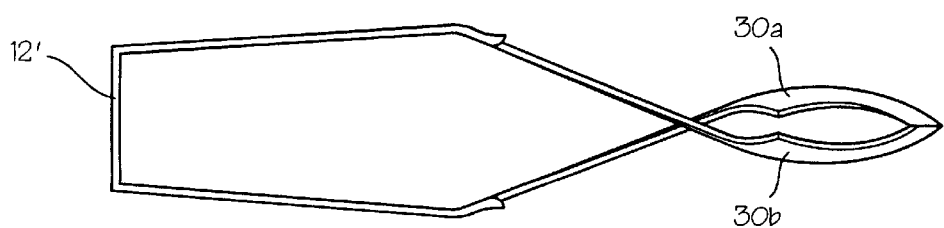
FIG. 13 is a generally top view of an alternate embodiment of the multi-purpose tongs of the present invention with the U-shaped portion of the handle having a square or trapezoidal configuration.

With reference to FIG. 13, the apex portion of U-shaped handle of the multi-purpose tongs is configured into a square or trapezoidal U-shaped portion 12'.

Figure 14:
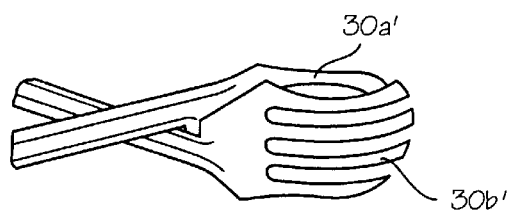
FIG. 14 is a fragmentary perspective view of a portion of the multi-purpose tongs of the present invention with the holding members being shaped as forks.

FIG. 14 shows an embodiment of the multi-purpose tongs 15 of the invention, in which holding members 30a', 30b' are all formed into a rounded fork shape instead of a bowl shape, whereby the multi-purpose tongs can be utilized as forks when necessary.

Figure 15:
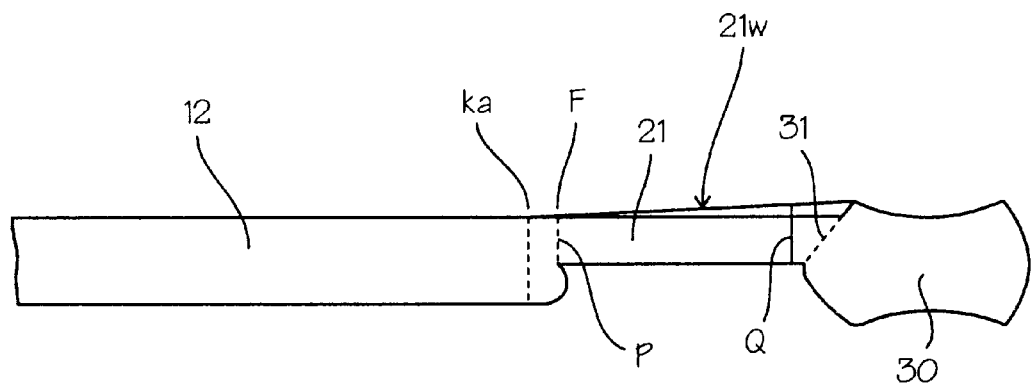
FIG. 15 is a fragmentary side view, partly in schematic to illustrate various relationships, of another embodiment of the multi-purpose tongs of the present invention with the gripping arms being gradually widened from the handle to the holding members.

With reference to FIG. 15, a schematic view of the multi-purpose tongs of the invention, in which two arms 21 are gradually widened slightly along the direction from handle 12 to holding end 30, is shown. The width P is widened from joint F of arm 21 and handle 12 to width Q, with Q>P. Comparing with the gripping arms 20a, 20b configurations of the embodiment shown in FIG. 2, the strength of arms 21 can thus be increased. The strength of the connecting portions 31 between the gripping arms and the holding members can also be increased, whereby the strength of the entire multi-purpose tongs is increased.

Figure 16:
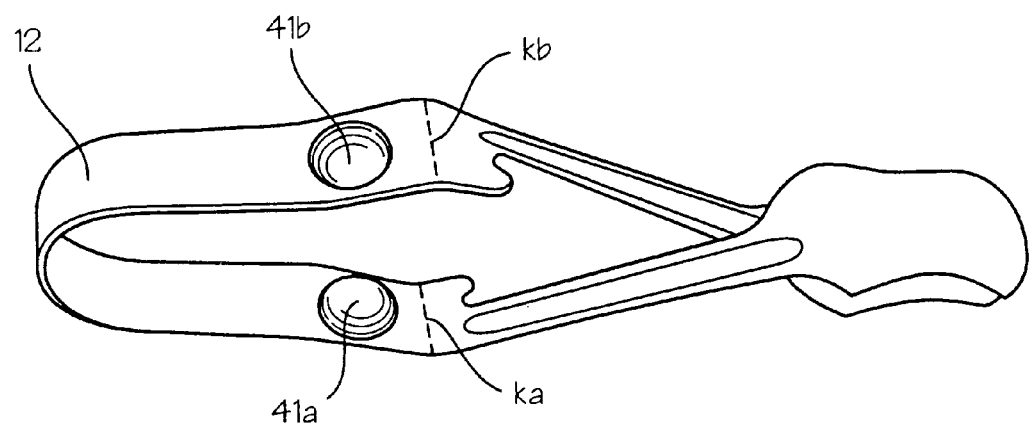
FIG. 16 is a perspective view of a fourth embodiment of the multi-purpose tongs of the present invention, showing an alternate finger rest configuration.

With reference to FIG. 16, an alternate embodiment of the finger rests 41a, 41b is formed by stamping an elliptical recess at portions of the handle adjacent to the bends at Ka and Kb as previously described.

In summary, the constructional features and alternative constructional variations of the multi-purpose tongs of the invention can provide a new and convenient technology for industries involved with catering utensils and tools for holding small articles.

While preferred embodiments of the invention have been set forth for purposes of illustrating the invention, the foregoing description should not be deemed a limitation of the invention herein. Accordingly, various modifications, adaptations and alternatives may occur to one skilled in the art without departing from the spirit and scope of the present invention.

What is claimed is:

1. A pair of multi-purpose tongs comprising:
   a single resilient piece of formed sheet metal comprising:
   a U-shaped handle having first and second wings extending forward from the apex of the U shape to bending points (ka, kb) at an apex angle α, each wing then oppositely bending inwards at an angle β;
   each wing having corresponding first and second stopper guides positioned in offset relationship from each other;
   first and second arms integrally extending outwards along a length from the wings of said handle, with their width being less than that of the handle, said first and second arms bulgedly deformed alone said length, said first arm being positioned opposite to said second guide and said second arm being positioned opposite to said first guide; and
   first and second holding members having first and second ends and opposite side edges extending from said first ends to said second ends, said first ends integrally extending from corresponding first and second arms, each holding member second end defining a convex gripping edge and each said side edge defining a concave arc along substantially the entire extent thereof, said holding members comprising rounded holding surfaces defining spoon-shaped structures capable of holding liquids,
   the first and second arms being crossed after being twisted slightly inwards so that the holding members mutually engage alone the entire length of said gripping edges, defining an extreme distal front surface substantially coinciding with a central plane through the apex, whereby the U-shaped handle is resiliently deformable to present a stable crossed state and an inward force applied to the handle displaces the holding members apart to define an opening span.

2. The multi-purpose tongs as claimed in claim 1, wherein the resilience of the multi-purpose tongs can be adjusted by varying angles α and β of the handle.

3. The multi-purpose tongs as claimed in claim 1, wherein the shape of the multi-purpose tongs can be adjusted by varying angles α and β of the handle.

4. The multi-purpose tongs as claimed in claim 1, wherein said holding members further comprise an abutment step adjacent to the said corresponding arm for preventing the two arms from sliding out of the crossed state.

5. The multi-purpose tongs as claimed in claim 1, wherein said stopper guides are bent outwards for facilitating engagement by a user's fingers.

6. The multi-purpose tongs as claimed in claim 1, wherein said handle further comprises contoured bulges to facilitate holding by hand.

7. The multi-purpose tongs as claimed in claim 1, wherein the apex of said U-shaped handle has the general shape selected from the group consisting of a square, or trapezoid.

8. The multi-purpose tongs as claimed in claim 1, wherein said holding members have a rounded fork shape.

9. The multi-purpose tongs as claimed in claim 1 further comprising connecting portions between said holding members and arms, said connecting portions having a diagonal width greater than the width of the arms.

10. The multi-purpose tongs as claimed in claim 1, wherein either of the wings of said handle has a bend to define an outwardly open angle φ.

11. The multi-purpose tongs as claimed in claim 1 and further comprising contoured finger rests mounted to said wings.

12. The multi-purpose tongs as claimed in claim 1, wherein the arms each have an inner edge and said edges continuously engage as said holding members are forced apart.

13. The multi-purpose tongs as claimed in claim 1, wherein the handle further has a width, said width increasing from said apex to the distal end portions of said wings.

14. The multi-purpose tongs as claimed in claim 1, wherein the stopper guides have a rounded vertex shape.

15. The multi-purpose tongs as claimed in claim 1, wherein the stopper guides can be adjustably positioned to define the maximum opening span.

16. The multi-purpose tongs as claimed in claim 1, wherein the stopper guides are tilted outwardly to form a portion of a finger rest.

17. The multi-purpose tongs as claimed in claim 1, wherein the arms each have a width which increases from the portion adjacent the handle to the portion adjacent the holding member.

18. The multi-purpose tongs as claimed in claim 1, wherein the handle further comprises generally elliptical-shaped depressions adjacent to bending points Ka, Kb.

* * * * *